(12) United States Patent
Hosoya

(10) Patent No.: US 7,032,040 B2
(45) Date of Patent: Apr. 18, 2006

(54) DATA TRANSFER METHOD AND DISK CONTROL UNIT USING IT

(75) Inventor: Mutsumi Hosoya, Fujimi (JP)

(73) Assignee: Hitachi, Ltd., Tokyo (JP)

( * ) Notice: Subject to any disclaimer, the term of this patent is extended or adjusted under 35 U.S.C. 154(b) by 136 days.

(21) Appl. No.: 10/768,669

(22) Filed: Feb. 2, 2004

(65) Prior Publication Data

US 2005/0080946 A1    Apr. 14, 2005

(30) Foreign Application Priority Data

Oct. 14, 2003 (JP) ............................. 2003-353219

(51) Int. Cl.
*G06F 3/00* (2006.01)

(52) U.S. Cl. .............................. 710/19; 710/5; 710/18; 714/18; 714/25; 714/48

(58) Field of Classification Search .................... 710/5; 714/1–6, 18, 25, 48–54
See application file for complete search history.

(56) References Cited

U.S. PATENT DOCUMENTS

| | | | | |
|---|---|---|---|---|
| 5,915,092 | A | 6/1999 | Morita et al. ................ | 709/213 |
| 5,938,786 | A * | 8/1999 | Gregg ......................... | 714/748 |
| 6,006,100 | A * | 12/1999 | Koenck et al. .............. | 455/466 |
| 6,345,315 | B1 | 2/2002 | Mishra ....................... | 719/329 |

(Continued)

FOREIGN PATENT DOCUMENTS

JP          8-179999         7/1996

(Continued)

OTHER PUBLICATIONS

Huang et al., MHTP—A Multimedia High-Speed Transport Protocol, Department of Computer Science and Information Engineering, National Taiwan University, Taipei, Taiwan, R.O.C., 1992.

(Continued)

*Primary Examiner*—Kim Huynh
*Assistant Examiner*—Alan S Chen
(74) *Attorney, Agent, or Firm*—Mattingly, Stanger, Malur & Brundidge, P.C.

(57) ABSTRACT

The present invention provides a reliable and high-speed data transfer method that achieves a high transfer efficiency and a high application processing efficiency concurrently and a disk control unit (disk controller) using such a method. In reliable data transfer in which, when data is transferred from an initiator to a target, the data received by the target is checked for validity by using an error check code attached to the data, a transfer status indicating whether the data is valid is returned from the target to the initiator, and, if a transfer error occurring during the data transfer is detected by the transfer status, the initiator retries to transfer the data to the target, a data transfer method for logical records that are units of data transfer between the initiator and the target is disclosed. This method is characterized in that: when each logical record transferred by a transfer request issued by the initiator arrives correctly on the target, the target posts a completion status corresponding to the transfer request for the logical record to a completion queue existing in the target; a plurality of logical records in a block are batch transferred; the initiator confirms the transfer status at every batch transfer; and, for each logical record that meets a predetermined batch transfer condition, the target posts a completion status corresponding to the transfer request for the logical record to the completion queue existing in the target upon correct reception of the logical record.

6 Claims, 18 Drawing Sheets

U.S. PATENT DOCUMENTS

| | | | |
|---|---|---|---|
| 6,854,014 B1* | 2/2005 | Amin et al. | 709/227 |
| 2001/0034799 A1 | 10/2001 | Ito et al. | 709/250 |
| 2002/0183936 A1* | 12/2002 | Kulp et al. | 702/19 |
| 2003/0188035 A1 | 10/2003 | Lubbers et al. | 719/310 |
| 2004/0030982 A1 | 2/2004 | Aldridge et al. | 714/776 |
| 2004/0042451 A1 | 3/2004 | Takaku | 370/389 |

FOREIGN PATENT DOCUMENTS

| | | |
|---|---|---|
| JP | 08-179999 | 7/1996 |
| JP | 2001-333048 | 11/2001 |

OTHER PUBLICATIONS

InfiniBand Architecture Specification vol. 1, Release 1.1, InfinBand Trade Association, 2002.

Mathis et al., TCP Selective Acknowledgment Options, Network Working Group, Sun Microsystems, 1996.

Transmission Control Protocol, DARPA Internet Program, Protocol Specification, 1981.

InfiniBand Architecture Specification, Release 1.0a, (InfiniBand Architecture Release 1.0a vol. 1—General Specification).

* cited by examiner

DATA TRANSFER METHOD AND DISK CONTROL UNIT USING IT

BACKGROUND OF THE INVENTION

1. Field of the Invention

The present invention relates to a data transfer method for transferring data through a network in a highly reliable manner and at a high speed and to a disk control unit (disk controller) for controlling a plurality of disk drives.

2. Description of Related Art

With enhancement of information communications infrastructures, there is a need for even higher processing capabilities of information communications systems. As more miniaturized LSI integrated circuits have lately been evolved, in the current situation, system performance depends on the capability of data transfer between LSI devices. Therefore, study efforts are underway to enhance the IO system capability and augment its functions vigorously. Higher transfer speed has been achieved and communication protocol engines with a variety of transport functions have been developed.

For example, InfiniBand transfer modes defined in Infini-Band Architecture Specification Release 1.0a provide a data transfer method wherein an interface between an application process and an IO system is supported by a queue pair (QP) consisting of a send queue (SQ) and receive queue (RQ) and a completion queue (CQ) to which a completion status is posted when processing of a request placed in the queue pair is completed. These queues are explained, using FIG. 4.

A process 51 and a process 52 communicate with each other, using two queue pairs for each process. The process 51 has a queue pair 41 consisting of a send queue 11 and a receive queue 21 and a queue pair 42 consisting of a send queue 12 and receive queue 22. Likewise, the process has a queue pair 43 consisting of a send queue 13 and a receive queue 23 and a queue pair 44 consisting of a send queue 14 and receive queue 24. In a completion queue 31, a completion status for the queue pair 41 and queue pair 42 is stored. In a completion queue 32, a completion status for the queue pair 43 and queue pair 44 is stored.

As an entry to the send queue, a transfer request is placed. A data unit to be transferred by this transfer request is referred to as a logical record. As an entry to the receive queue, a pointer to a receive buffer is stored. A transfer request placed in the send queue 12 has a pointer to a record buffer 81 within a process buffer 71 and a transfer request place in the send queue 14 has a pointer to a record buffer 82 within a process buffer 72. Likewise, in the receive queues 22 and 24, respectively, pointers to the record buffers 81 and 82 are stored.

Between two queue pairs that communicate with each other, send queue to receive queue connections are set up. The send queue 12 connects to the receive queue 24 and the send queue 14 connects to the receive queue 22. Then, when a transfer request placed in the send queue 12 is processed, a logical record stored in the record buffer 81 is transferred to the record buffer 82 specified by the receive queue 24. Upon the completion of fault-free transfer of the record, a completion status is posted from the receive queue 24 to the completion queue and a completion status is posted from the send queue 12 to the completion queue 31.

Control operation of these queue pairs and completion queues is performed by hardware called a host channel adapter (HCA). An example of the HCA configuration is shown in FIG. 5. The HCA comprises a receiving port 613, a transmitting port 623, a receiving link layer logic 631, a transport layer logic 642, a processor 633, a transmitting link layer logic 641, a transport layer logic 642, a processor 643, a memory 650, and a connection interface 660. The HCA communicates with an application process via the connection interface and memory. The receiving side and the transmitting side can operate in parallel and the processors and link layer and transport layer logics enable high-speed execution of high-functionality protocol processing.

How a single record transfer request is process between two HCAs is explained, using FIG. 6, for an instance where a record in a record buffer 84 within a process buffer 73 of the HCA1 side is transferred to a record buffer 84 within a process buffer 74 of the HCA2 side. At the HCA 1, the record in the record buffer 83 is disassembled into data of size suitable for transmission and an appropriate header and an error check code (CRC) are attached to each data. Packets 401–403 each containing data with a header and CRC are transferred. At the HCA2, received packets are checked for whether an error occurs by the CRC. If an error is detected, the HCA2 notifies the HCA1 of the error by returning a NAK (Negative AcKnowledgement). The HCA1 retries to transfer a packet for which the NAK has been returned. When the HCA2 has received all packets correctly, the HCA2 reassembles the received data into the logical record and stores the record into the record buffer 84. The HCA2 posts a completion status to a completion queue 34 and notifies the HCA1 that reception of the record is complete. When the HCA1 is notified that the reception is complete from the HCA2, the HCA1 posts a transfer completion status to a completion queue 33 and, at this point of time, the sequence of transfer request processing terminates.

Another example of how an RDMA transfer request is processed between two HCAs is explained, using FIG. 7. In this example of RDMA transfer, data in an area of source of RDMA transfer 85 within application memory space 75 of an initiator is transferred to an area of destination of RDMA transfer 86 within application memory space 76 of a target. In the case of RDMA transfer, because data is directly transferred into destination application memory space, destination memory address information must be attached to data. Except that, operation is the same as for a single record transfer request. At the HCA1, the data in the area of source of RDMA transfer 85 is divided into suitable size and placed in packets and the HCA1 transfers the packets serially to the HCA2. The HCA2 stores each data from the received packets into a designated location within the area of destination of RDMA transfer 86. If necessary, packet transfer is retried, and each packet data is reassembled into complete data in the area. When the HCA2 has received all packets correctly, the HCA2 posts a completion status to a completion queue 36 and notifies the HCA1 that reception of the data is complete. When the HCA1 is notified that the reception is complete from the HCA2, the HCA1 posts a transfer completion status to a completion queue 35 and, at this point of time, the sequence of transfer request processing terminates.

The protocol discussed hereinbefore is a reliable data transfer method which ensures that transferred data,is free of errors and this method is fundamental and commonly used for a wide rage of application. Two essential characteristics of the traditional method of reliable data transfer are:

1. The target posts the completion status after making sure that a whole logical record, which is a unit of transfer request, is free of errors.

2. The initiator starts a transfer of the next logical record after confirming the notification of the fault-free transfer completion status of the whole logical record from the target.

The above characteristics are explained, using FIGS. 2 and 3. In FIG. 2, an application (AP) 1 of the HCA1 side starts a transfer of a logical record 221 by issuing a transfer request 121. If the HCA2 detects a transfer error, the transfer is retried. When the HCA2 has received the logical record 221 correctly, the HCA2 posts a completion status 321 to a completion queue of an application 2. Upon receiving the completion status 321, the application 2 can start a process 721 using the logical record 221. The HCA2 that has received the logical record 221 correctly notifies the HCA1 of the reception completion and the HCA1 posts a transfer completion status 361 to a completion queue of the application 1. As is obvious in this example, the target-side application 2 receives the completion status 321 after the whole logical record 221 has been received completely. On the other hand, the initiator-side application 1 can initiate a transfer request of the next logical record after knowing that the HCA2 has received the whole logical record 221 completely.

In FIG. 3, the application 1 of the HCA1 side starts an RDMA transfer by issuing a transfer request 131. In this case, data in the area of source of RDMA is regarded as one logical record. The HCA2 receives a plurality of packets of divided data and issues a retry request when necessary. Upon the completion of fault-free transfers of all packets (transfer of the whole logical record), the HCA2 posts a completion status 331 to a completion queue of the application 2 of the HCA2 side. Upon receiving the completion status 331, the application can start a process 731 using the data in the area of destination of RDMA transfer, that is, the transferred logical record. The HCA2 that has received the logical record correctly notifies the HCA1 of the reception completion and the HCA1 posts a transfer completion status 371 to the application 1 (its completion queue).

As is obvious in this example also, the target-side application 2 receives the completion status 331 after the whole logical record (the data in the area of destination of RDMA transfer) has been received completely. On the other hand, the initiator-side application 1 can initiate a transfer request of the next logical record after knowing that the HCA2 has received the whole logical record (the data in the area of destination of RDMA transfer) completely.

In this way, the traditional method of reliable data transfer was required to have the above two essential characteristics as a mechanism for avoiding transfer errors. Another example of the traditional method of reliable data transfer disclosed in Japanese Published Unexamined Patent Application No. Hei 8-179999. As this example states, a method that assures the integrity of data transferred before an error occurring is known, but such a method is still required to fulfill the above two characteristics.

[Japanese Patent Document Cited 1]
Japanese Published Unexamined Patent Application No. Hei 8-179999.

[Non-Patent Document Cited 1]
InfiniBand Architecture Specification Release 1.0a

SUMMARY OF THE INVENTION

The traditional method of reliable data transfer takes advantage of the above two characteristics in order to avoid transfer errors, but this fact has the opposite effect that is considered as the following problems.

First, due to the characteristic that "the initiator must confirm that the target has received a whole logical record correctly," in addition to the time required to transfer the logical record to the initiator, an overhead time to notify the initiator of transfer completion from the target occurs. This overhead time becomes noticeable when short logical records are transferred and causes a significant decrease in communication channel efficiency. Particularly, as the quantity of tasks to be processed by the target-side application increases with the enhancement of IO system functions, the time required to notify the initiator of the transfer completion status tends to increase. Because the time required to transfer a logical record is shortened as the transfer speed increases, the overhead for the notification of completion of transfer from the initiator relatively increases and this deteriorates transfer efficiency. Some improvement in this respect is a challenge.

Next, due to the characteristic that "the target posts the completion status after making sure that a whole logical record is free of errors," if, for example, correct data reception is done successfully by the middle of a logical record and an error occurs, the target-side application cannot distinguish and make effective use of the correctly received part of the record and has to delay the start of a process using the received logical record until the whole logical record is received completely. This delay time before the start of the process becomes noticeable for long logical records and causes a decrease in processing efficiency of the application. The longer the record, the higher will be the likelihood of transfer error occurring in the record. Retry due to a transfer error further increases the delay time and decreases the processing efficiency. Even during the transfer of a great length record or even when a transfer error occurs, avoiding a decrease in the application processing efficiency is another challenge.

An object of the present invention is to overcome the above-described drawbacks of the prior art and to provide a data transfer method that achieves a high transfer efficiency and a high application processing efficiency concurrently. More specifically, an object of the invention is to provide a data transfer method that effectively cuts the time consumed for the notification of reception completion at the target and the time consumed for the notification of transfer completion to the initiator and a disk control unit (disk controller) using such a data transfer method.

In order to achieve the foregoing objects and in accordance with one aspect of the present invention, in reliable data transfer in which, when data is transferred from an initiator to a target, the data received by the target is checked for a communication error by using an error check code attached to the data, a transfer status indicating whether the communication error occurs is returned from the target to the initiator, and, if a transfer error occurring during the data transfer is detected by the transfer status, the initiator retries to transfer the data to the target, there is provided a protocol of data transfer of logical records that are units of data transfer between the initiator and the target, arranged such that a plurality of the logical records in a block are batch transferred, the initiator confirms the transfer status at every batch transfer, each logical record is transferred by a transfer request issued by the initiator, and, for each logical record that meets a predetermined batch transfer condition, the target posts a completion status corresponding to the transfer request to a completion queue existing in the target upon correct reception of the logical record.

Moreover, if the target detects a logical record transfer error in the middle of a batch transfer by the error check code, the target negates the reception of and stops posting the completion status of the logical record and subsequent logical records until the batch transfer terminates.

Further, if the target detects a logical record transfer error in the middle of a batch transfer by the error check code, the target negates the reception of and stops posting the completion status of the logical record and subsequent logical records that are not permitted for reception by a value specified in a batch transfer condition field until the batch transfer terminates.

Furthermore, the target includes the ID of the earliest logical record in which a transfer error has been detected in the transfer status which is confirmed at every batch transfer and the initiator starts a transfer retry from the logical record in which the transfer error occurred, based on the transfer status.

Moreover, in the middle of a batch transfer, the initiator or the target can stop the batch transfer by issuing a cancel request.

In another aspect of the invention, there is provided a disk controller comprising a plurality of host interface units interfacing with a host computer and a plurality of disk interface units interfacing with disk drive equipment. Each host interface unit includes a memory for temporary storage of data that the host computer reads or writes and data transfer is performed between this memory and the host computer. Each disk interface unit includes a cache memory for temporary storage of data that the disk drive equipment reads or writes and data transfer is performed between this memory and the disk drive equipment. In the disk control unit (disk controller), the above-described data transfer method is applied to data transfer between the plurality of host interface units and the plurality of disk interface units, data transfer across the plurality of host interface units, or data transfer between the plurality of host interface units or the plurality of disk interface units and the above memory units.

In a further aspect of the invention, there is provided a disk control unit (disk controller) comprising a plurality of host interface units interfacing with a host computer, a plurality of disk interface units interfacing with disk drive equipment, a plurality of memory units, and a plurality of processor units. The host interface units in conjunction with the processor units perform data transfer between the memory units and the host computer. The disk interface units in conjunction with the processor units perform data transfer between the memory units and the disk drive equipment. In the disk controller, the above-described data transfer method is applied to data transfer between the plurality of host interface units or the plurality of disk interface units and the processor units, data transfer between the plurality of memory units and the processor units, data transfer across the plurality of memory units, or data transfer across the plurality of processor units.

As described above, in the data transfer method of the present invention, the transfer requests for logical records in a batch are serially processed during the batch transfer and the initiator need not wait for the notification of the transfer completion status of an individual logical record from the target. Consequently, the time consumed for the notification of transfer completion of each logical record is dispensed with and transfer efficiency can be enhanced greatly.

According to the present invention, for correctly received logical records that meet a batch transfer condition, at the point of time when such a logical record has been received, its completion status is posted to a processing application. Therefore, even if a great number of logical records are batch transferred, upon the completion of receiving an individual logical record, the processing application can start the process for the record without waiting for the completion of the batch transfer of all the records. Thus, the application processing efficiency can be improved. Especially, even if a transfer error occurs during a batch transfer, the application can start process execution for correctly received logical records prior to the error occurrence upon the completion of receiving each of these records.

According to the present invention, a more detailed setting of the batch transfer condition for a batch transfer is possible. Even if a transfer error occurs during a batch transfer, a logical record having no data dependency with another record and no possibility of producing a problem in terms of arrival sequence can be set to be received always. Consequently, application processing efficiency can be enhanced and more efficient data transfer is feasible by reduction in the number of records to be resent.

According to the present invention, the time required for retry operation can be minimized by allowing the initiator to retry the transfer of only the logical records that need retry of transfer. Therefore, more efficient data transfer is feasible by reduction in the number of records to be resent.

According to the present invention, if continuation of a batch transfer of subsequent records becomes unnecessary because a transfer error has just occurred in the middle of the batch transfer and for other reason, it is possible to stop the batch transfer at once. Therefore, more efficient data transfer is feasible by eliminating an unnecessary transfer of logical records.

In the disk control unit (disk controller) of the present invention, the efficiency of data transfer between the host computer and the disk interface units can be improved greatly. Particularly, the disk control unit (disk controller) provides advantages: enhancing the efficiency of data transfer through a disk control (disk controller) internal network; and making it possible to cut the response time to IO requests from the host interface units and disk interface units and boost the processing capability of the disk controller.

DESCRIPTION OF THE PREFERRED EMBODIMENTS

Preferred embodiments of the present invention will be described in detail hereinafter, using the accompanying drawings.

Embodiment 1

Figure 1:
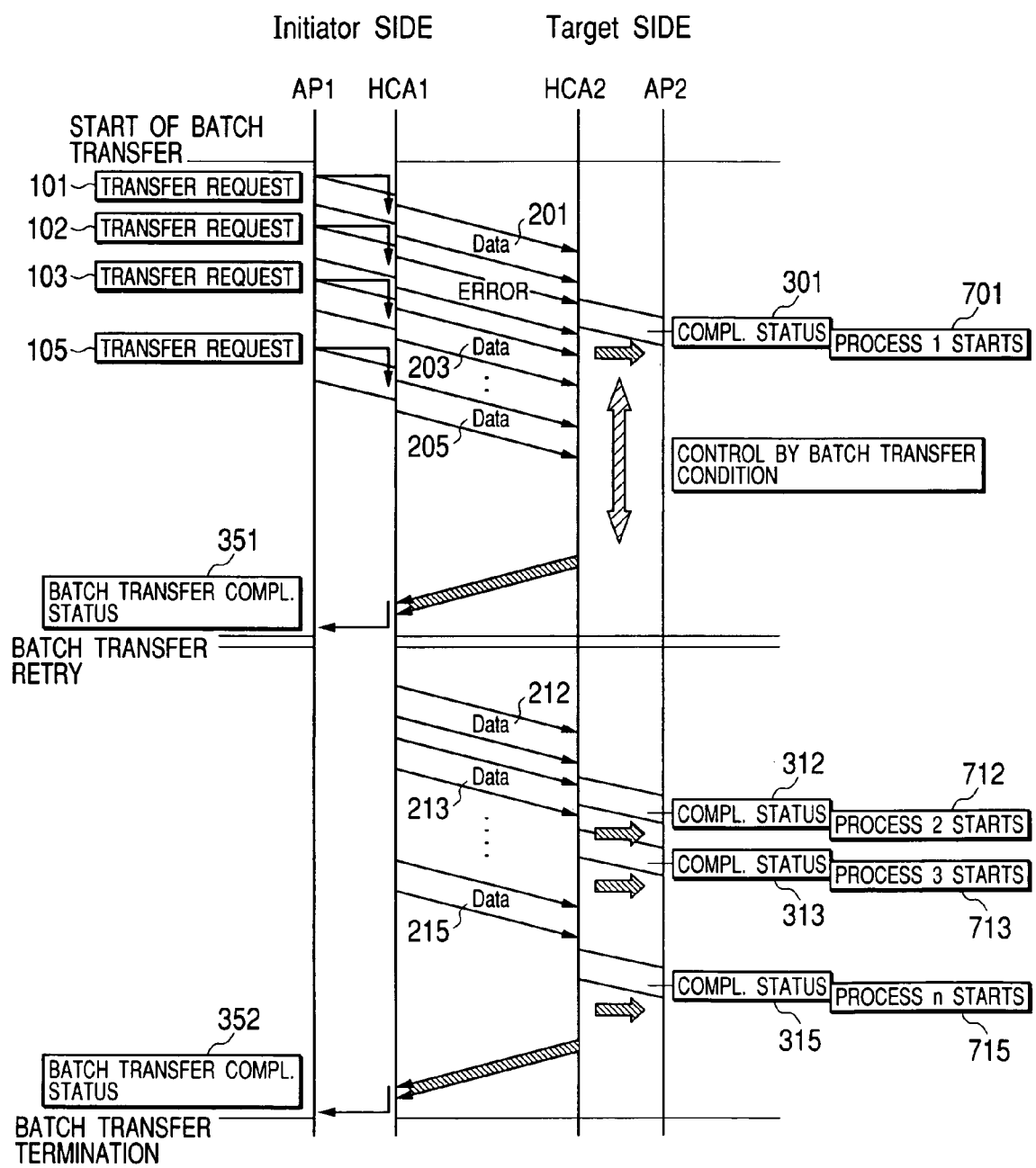
FIG. 1 is a diagram showing the operation principle of a high-speed data transfer method according to the present invention.
Figure 2:
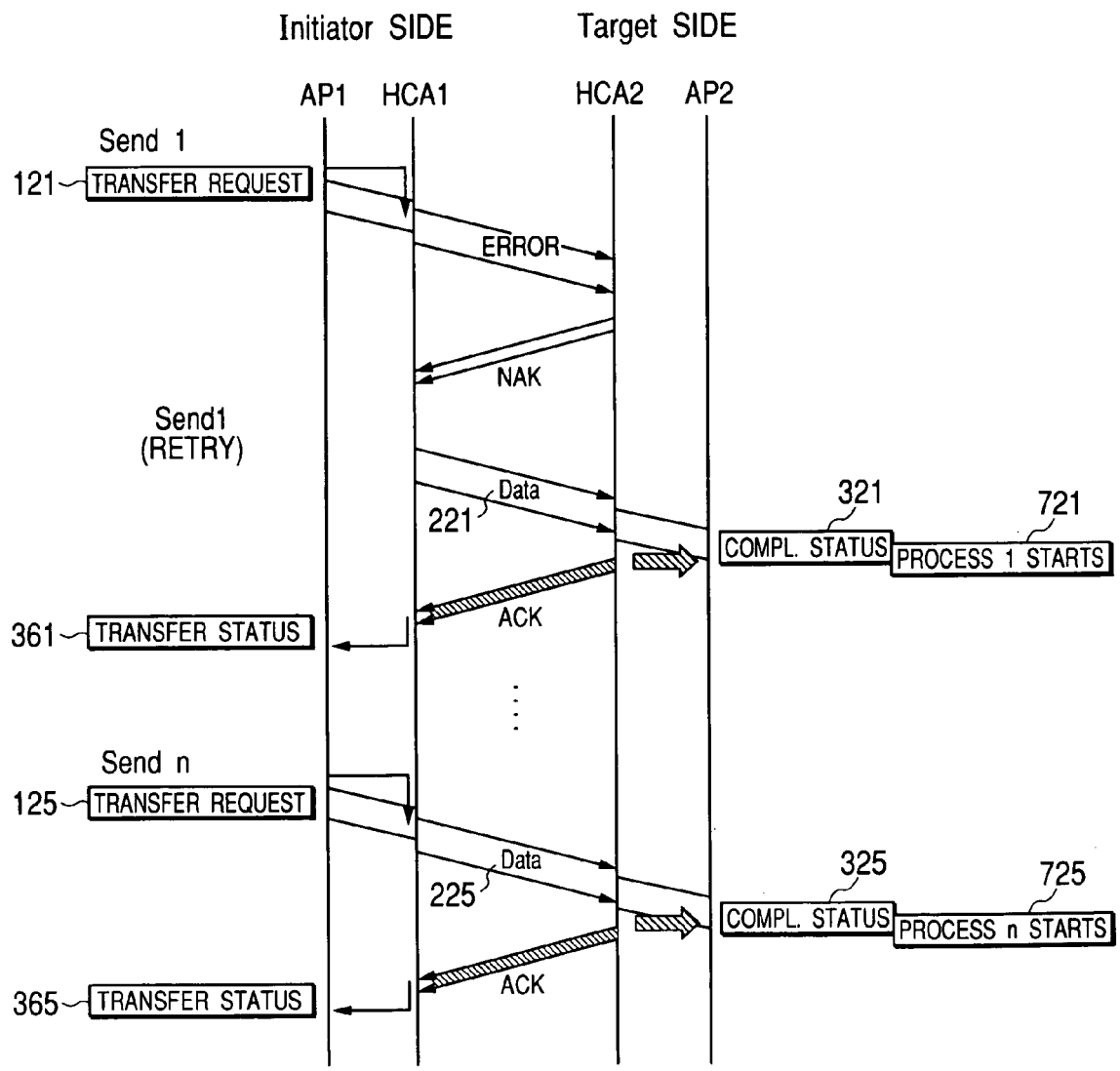
FIG. 2 is a diagram showing the operation principle of a traditional method of data transfer.
Figure 3:
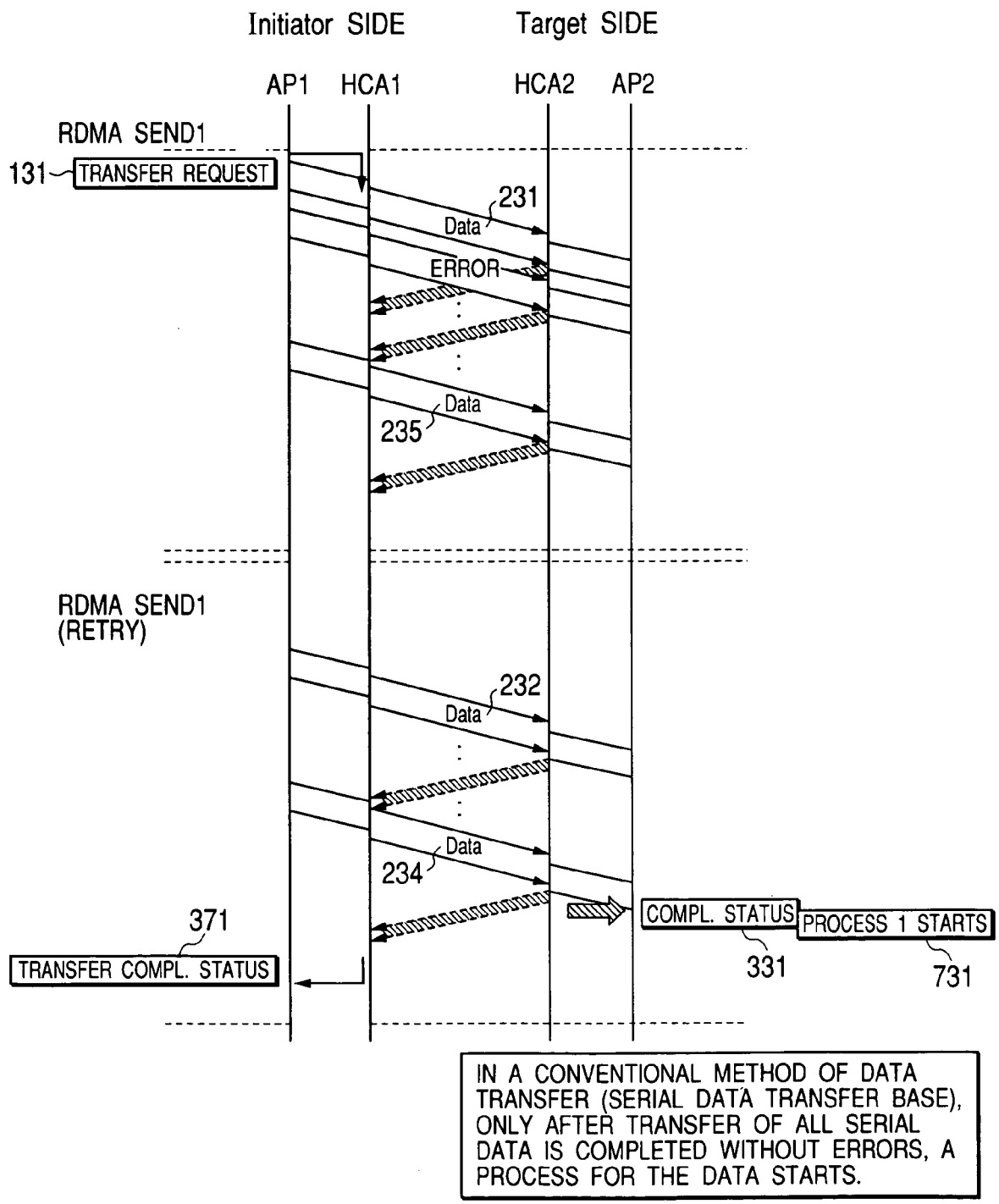
FIG. 3 is a diagram showing the operation principle of a traditional method of data transfer.
Figure 4:
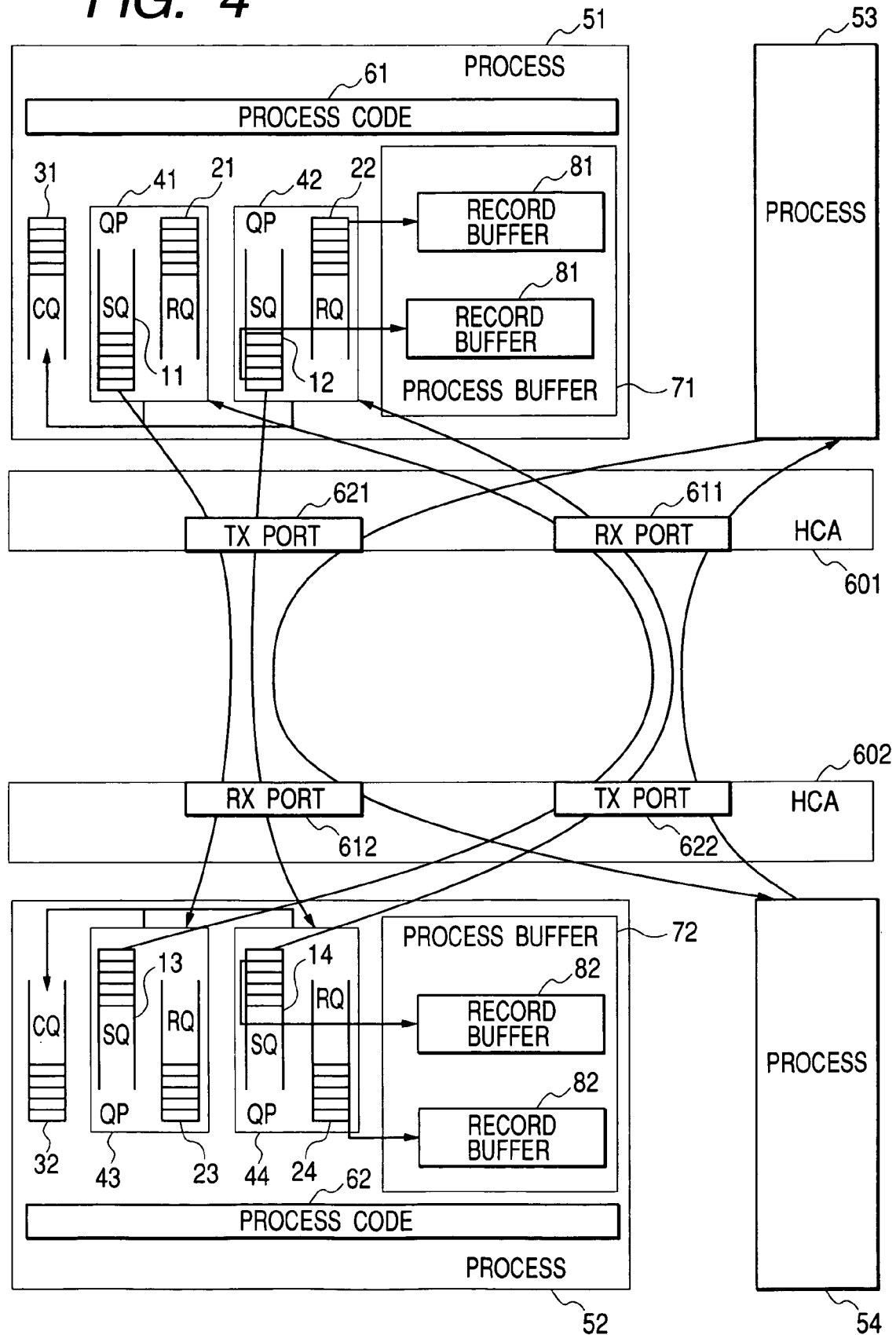
FIG. 4 is a diagram showing an IO system configuration.
Figure 8:
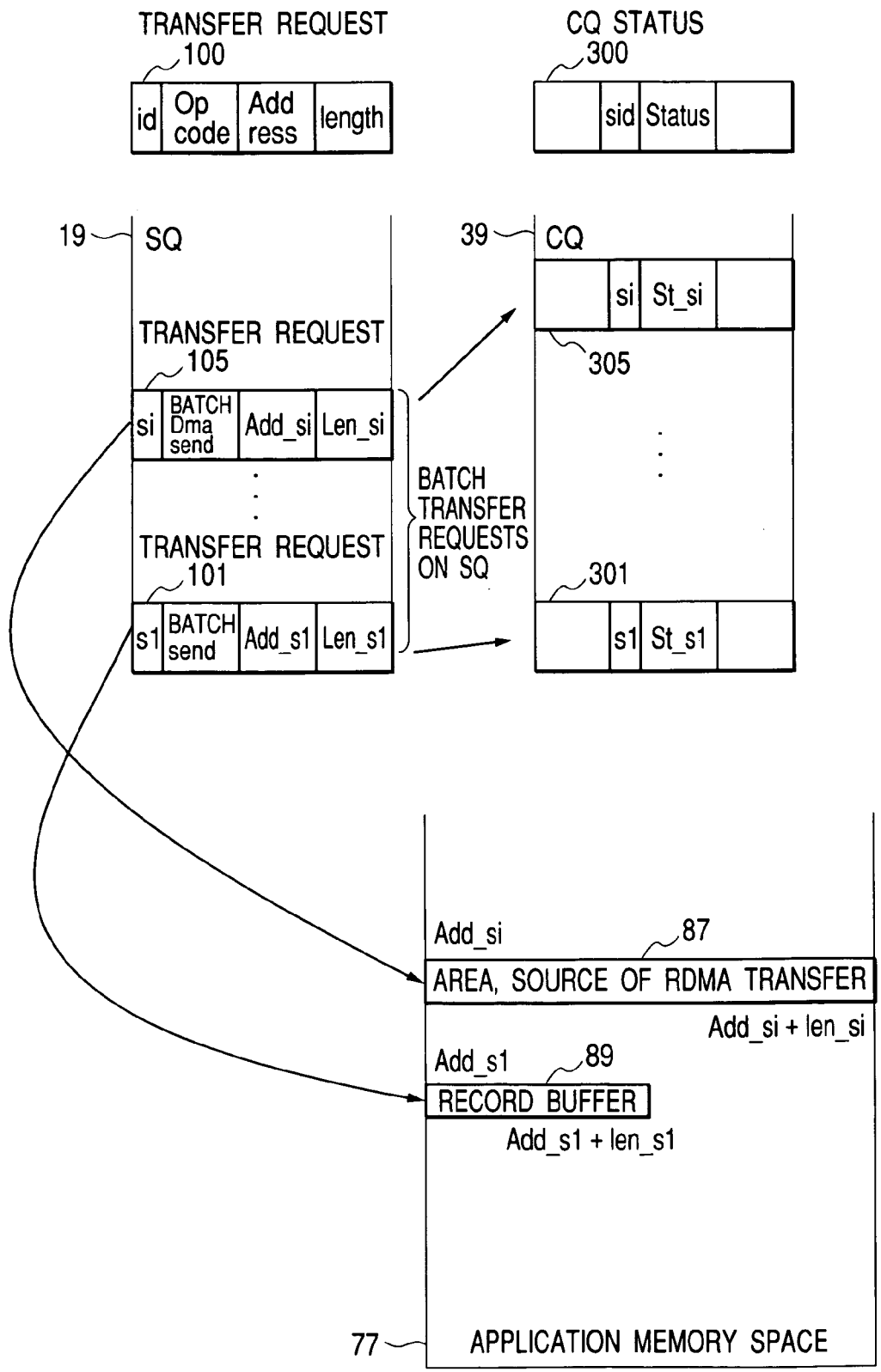
FIG. 8 is a diagram showing the structures of transfer requests and logical records which are used in the high-speed data transfer method of the present invention.

A preferred embodiment of the present invention is shown in FIGS. 1 and 8. In the data transfer method of the present invention, a plurality of logical records in a bock are batch transferred. Therefore, a plurality of transfer requests are serially stored in the send queue of the initiator, as is shown in FIG. 8. Each transfer request comprises a transfer ID which is uniquely determined per logical record to be transferred, a transfer operation code which defies the operation of the transfer request, the start address of a record buffer to which the record is to be transferred, and buffer length. In FIG. 8, a transfer request 101 is an example of single-data transfer to a record buffer 89 and a transfer request 105 is an example of RDMA transfer to an area of destination of RDMA transfer 87. These transfer requests are defined as batch transfer requests.

In FIG. 8, a completion queue 39 which is used by the target to notify the initiator of completion of logical record reception and a completion status 300 (of a logical record) structure which is stored in the completion queue are also shown. The completion status 300 comprises a status ID corresponding to a logical record transfer ID and its completion status code.

An example of how the batch transfer requests are processed is shown in FIG. 1. Here, an application 1 issues transfer requests 101–105 to an application 2 via the HCA1 and HCA2. The HCA1 starts to transfer a logical record 201 by issuing a transfer request 101. The HCA2 makes sure that it has received the logical record 201 correctly and then posts a completion status 301 to the completion queue of the application 2. Upon receiving the completion status 301, the application 2 can start a process operation 701 for the logical record 201.

In the high-speed data transfer method of the present invention, unlike the traditional method, the initiator side need not wait for the notification of transfer completion status from the HCA2 to start to transfer a next logical record 102. The HCA2 starts to transfer the logical record 102 as soon as it finishes the transfer of the logical record 101. If an error is included in the received logical record 102, the HCA2 registers the receiving error of the logical record 102 in a batch transfer completion status and then proceeds to processing for a next logical record 103, wherein the HCA2 does not send a request to retry the transfer of the logical record 102 to the initiator, as the target-side HCA in the traditional method does. Once all batch transfer requests up to a transfer request 105 have been processed, the HCA2 returns a batch transfer completion status 351 to the HCA1. Upon receiving this status, the HCA1 retries the transfer of a logical record(s) not received correctly by the HCA2. For records 212–215 received correctly by the HCA2, the HCA2 posts their completion statuses 312–315 to the completion queue and the application 2 starts corresponding processes 712–715. When the HCA1 is notified of a batch transfer completion status 352 that signifies the correct transfer completion status of all batch transfer requests, the sequence of batch transfer terminates.

According to the present embodiment, the transfer requests for logical records in a batch are serially processed during the batch transfer and the initiator need not wait for the notification of the transfer completion status of an individual logical record from the target. Consequently, the time consumed for the notification of transfer completion of each logical record is dispensed with and transfer efficiency can be enhanced greatly.

According to the present embodiment, for correctly received logical records that meet a batch transfer condition, at the point of time when such a logical record has been received, its completion status is posted to the application. Therefore, even if a great number of logical records are batch transferred, upon the completion of receiving an individual logical record, the application can start the process for the record without waiting for the completion of the batch transfer of all the records. Thus, the application processing efficiency can be improved. Especially, even if a transfer error occurs during a batch transfer, the application can start process execution for correctly received logical records prior to the error occurrence upon the completion of receiving each of these records.

Embodiment 2

In the high-speed data transfer method of the present invention, when logical records to be batch transferred are received, only the records that meet the batch transfer condition are selectively received. Even if there is dependency across the records to be batched transferred, it can be assured that the time sequence of received records remains the same as for those before being transferred. For example, if a receiving error is included in a logical record, a method in which logical records that are being batch transferred subsequent to that logical record are negated can be carried out. By this method, after all batch transfer requests are serially processed, the transfer of all non-received records is retried at a time. This method of the present invention prevents dependency disorder in received logical records and has an advantage that the initiator need not wait for the notification of transfer completion from the target, as the initiator in the traditional method does.

Embodiment 3

Figure 9:
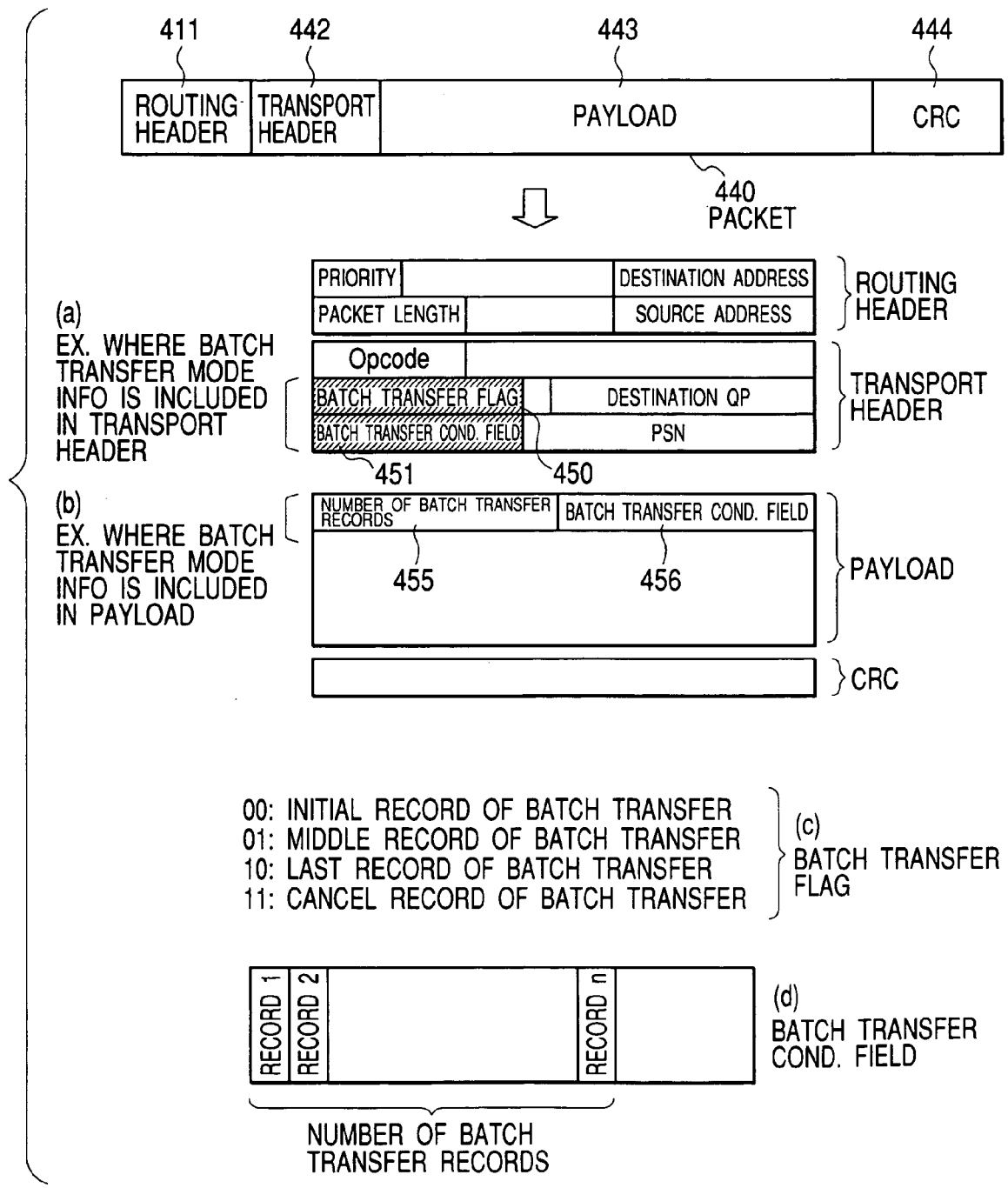
FIG. 9 is a diagram showing the structure of a packet which is used in the high-speed data transfer method of the present invention.

The following gives a more detailed explanation of the batch transfer condition for use in the high-speed data transfer method of the present invention, using FIG. 9. FIG.

9 shows the structure of a packet for use in the high-speed data transfer method of the present invention. The packet consist of a routing header 441 having information about routing, a transport header 441 containing information about transport processing, a payload 443 containing logical record data, and a CRC 444 which is an error check code. The routing header contains the destination address of the initiator or the target, priority information of the packet, and packet length. The transport header contains a process operation code that defines transfer processing and a destination queue pair number, a sequence number of the packet, a batch transfer flag 450 which defines batch transfer operation, and a batch transfer condition field 451.

The batch transfer flag 450 indicates that the packet is batch transferred and it can be determined whether the packet is being batch transferred by checking this flag. The batch transfer condition field 451 indicates data dependency across the logical records being batch transferred. When a value of "1" is set in a bit field corresponding to each logical record, this indicates that the logical record does not have dependency with another logical record. Even if an error occurs during a batch transfer, receiving a logical record for which a value of "1" is set in this bit field for the record does not produce a problem in terms of data arrival sequence.

As will be apparent later, in some embodiment, the batch transfer flag value and the batch transfer condition field value may be placed in the payload so that these values may be posted from the initiator to the target in advance. In that event, the transport header of each packet need not include the batch transfer flag and the batch transfer condition field.

According to the present embodiment, a more detailed setting of the batch transfer condition for a batch transfer is possible. Therefore, even if a transfer error occurs during a batch transfer, a logical record having no data dependency with another record and no possibility of producing a problem in terms of arrival sequence can be set to be received always. Consequently, application processing efficiency can be enhanced and more efficient data transfer is feasible by reduction in the number of records to be resent.

Embodiment 4

Figure 10:
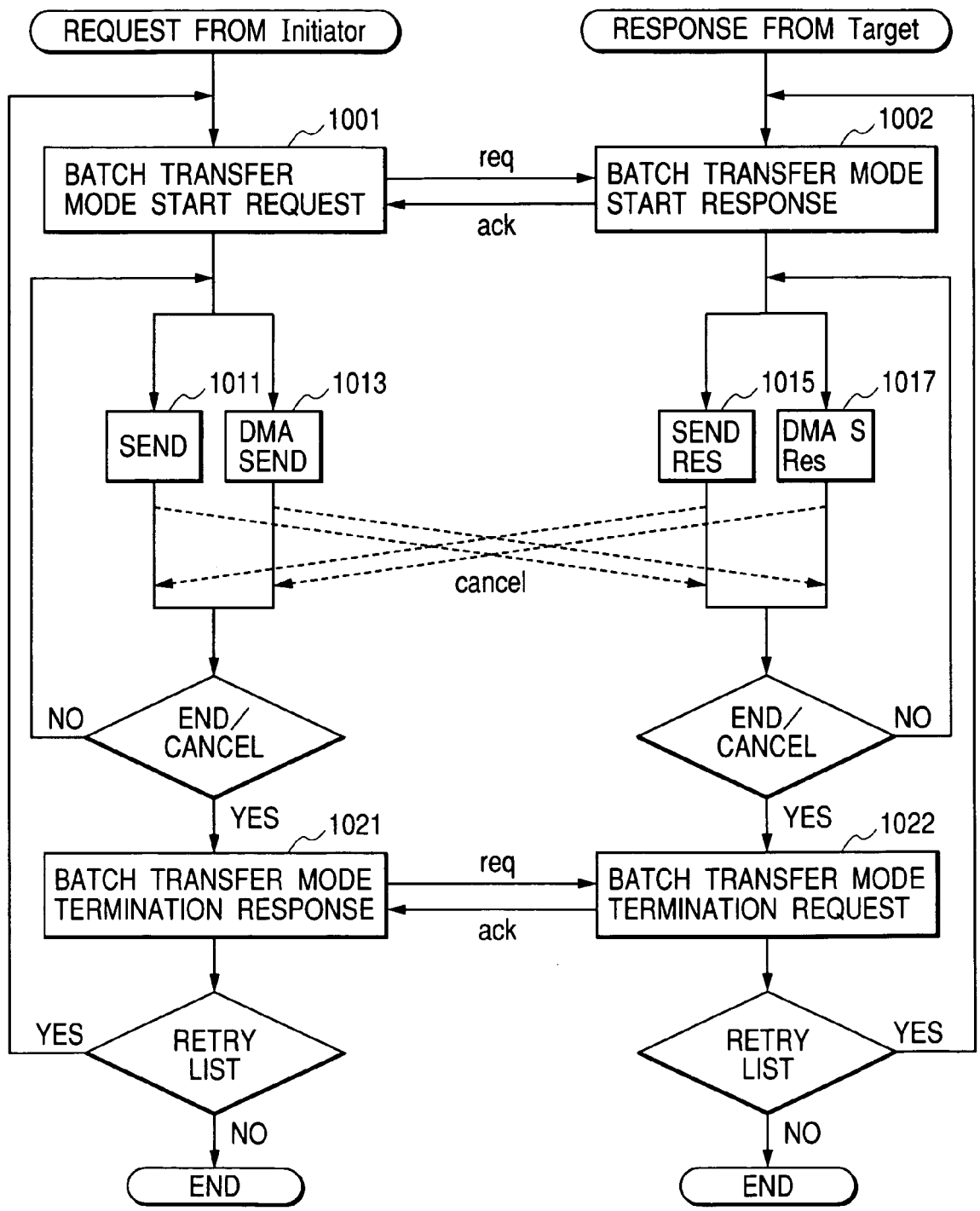
FIG. 10 shows an operation flowchart of the high-speed data transfer method of the present invention.

Operation flow of the high-speed data transfer method of the present invention is explained, using FIG. 10. Here, when a batch transfer starts, the initiator issues a batch transfer mode start request to the target. This request is transmitted in a normal reliable transmission packet and includes batch transfer related information such as the batch transfer condition field value in the payload of the packet as noted above. When an acknowledgement of this request packet from the target arrives on the initiator, both the initiator and the target enter the batch transfer mode. Then, the initiator starts to send batch transfer requests stored in the send queue serially and the target performs processing of responses to the requests. Upon termination of a sequence of processing of the batch transfer requests, the target sends a batch transfer mode termination request in the normal reliable transmission packet to the initiator.

At this time, the target includes a batch transfer completion status which is a batch transfer receiving log on the target in a part of the payload of the packet and sends the packet. The initiator sends an acknowledgement of this request packet and the initiator and the target leave the batch transfer mode. The initiator and the target refer to the batch transfer completion status and the initiator starts to retry the transfer, if necessary. That is, if there are logical records to be resent to the target, the initiator send the records serially, according to the above-described batch transfer procedure. Once all the logical records of batch transfer requests have been received by the target successively, the batch transfer terminates.

In the present embodiment, the target negates logical records received during the current batch transfer mode, subsequent to a transfer error occurrence, and, for such records, posts nothing to the completion queue of the application. Then, the target includes the transfer ID of the earliest logical record in which the transfer error has been detected during the batch transfer mode in the above batch transfer completion status and returns this status. The initiator starts to retry the transfer from the logical record in which the error was detected, its ID specified in the batch transfer completion status.

According to the present embodiment, as for correctly received logical records prior to a transfer error occurrence during a batch transfer, the application can start processes for such records upon the completion of receiving each of such records. Consequently, application processing efficiency can be enhanced even when a transfer error occurs and more efficient data transfer is feasible by reduction in the number of records to be resent.

Embodiment 5

In another embodiment, the above batch transfer completion status including a transfer ID list of logical records that need retry of transfer is returned. The initiator retries the transfer of records, referring to the transfer ID list posted from the target.

According to the present embodiment, the time required for retry operation can be minimized by allowing the initiator to retry the transfer of only the logical records that need retry of transfer. Therefore, more efficient data transfer is feasible by reduction in the number of records to be resent.

Embodiment 6

Figure 11:
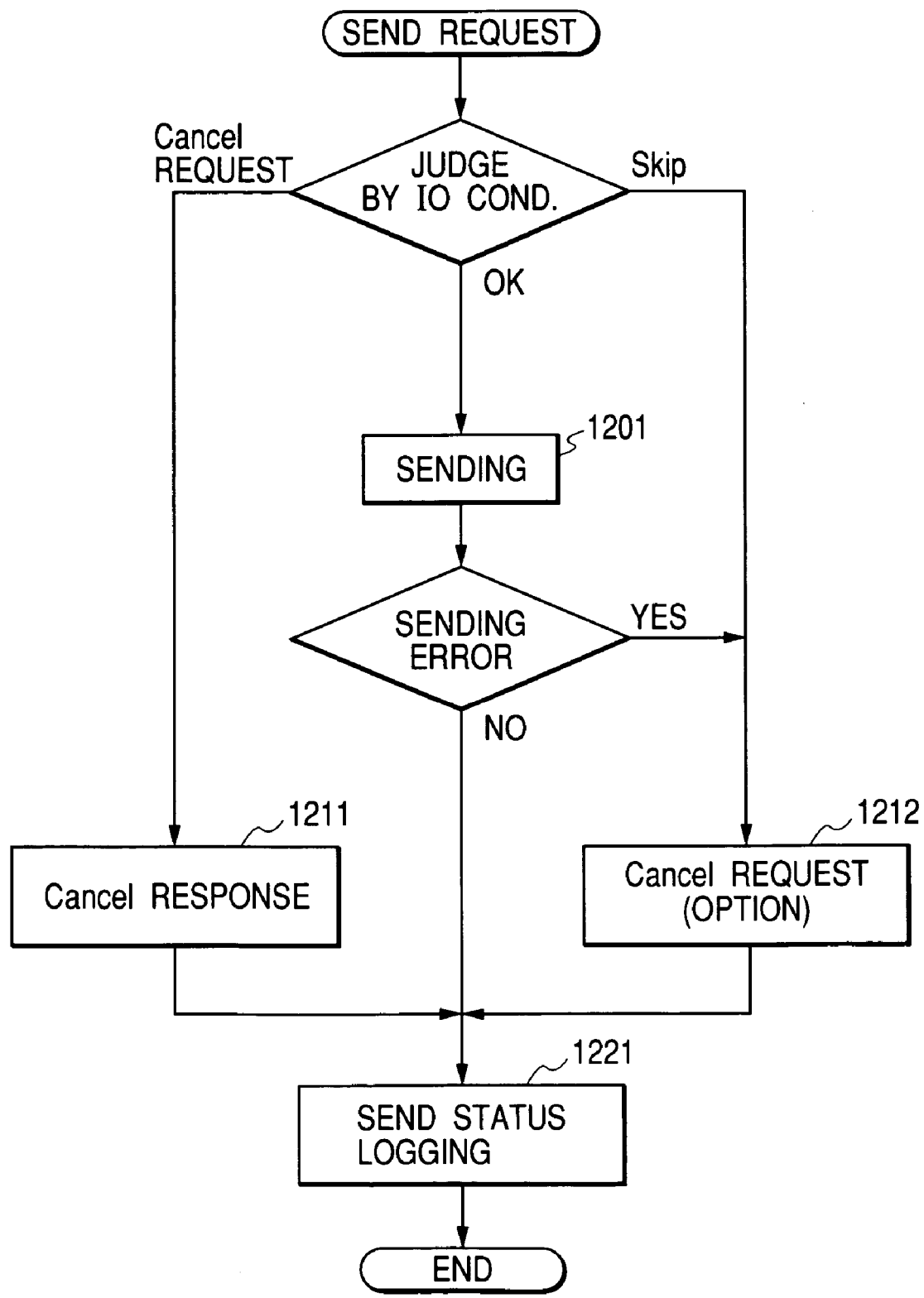
FIG. 11 shows a SEND request operation flowchart of the high-speed data transfer method of the present invention.
Figure 12:
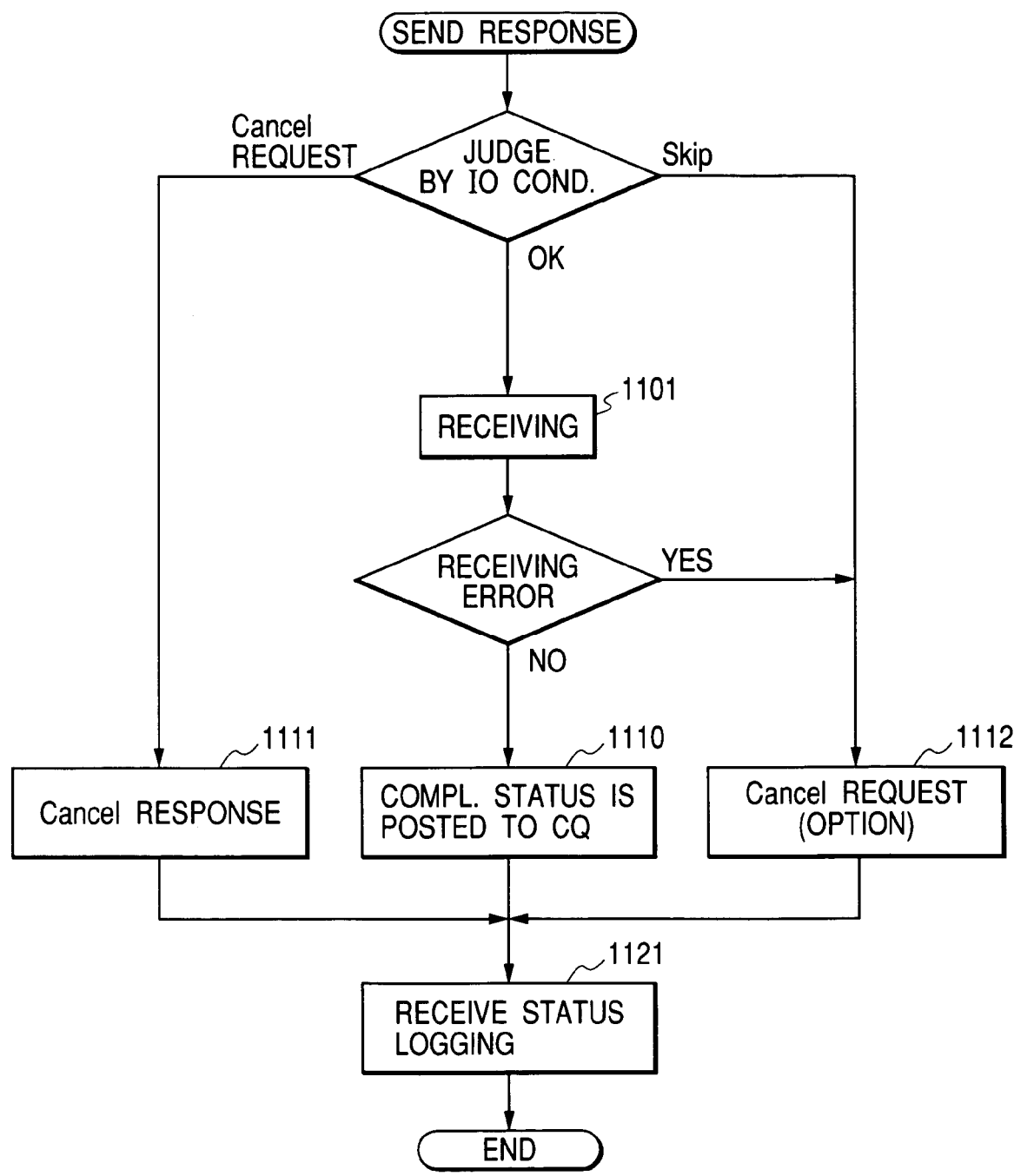
FIG. 12 shows a SEND response operation flowchart of the high-speed data transfer method of the present invention.

Details of operation of the high-speed data transfer method of the present invention are explained, using FIGS. 11 and 12. FIG. 11 shows a flowchart of SEND request operation in the batch transfer mode shown in FIG. 10. If the logical record meets the batch transfer condition, sending 1201 of the record is performed. After it is checked whether sending has been done correctly, send status logging 1221 is performed. FIG. 12 shows a flowchart of response operation to the SEND request. If the logical record meets the batch transfer condition, receiving 1101 of the record is performed. If the record has been received correctly, its completion status is posted to the completion queue 1110 and, finally, receive status logging 1121 is performed.

In either case of SEND request processing and SEND response processing, a logical record that does not meet the batch transfer condition is skipped. At this time, both initiator and target sides can issue cancel requests 1112 and 1212, respectively, to the other side to stop the batch transfer of subsequent records. The cancel request receiver returns a cancel response 1111 or 1211 and leaves the batch transfer mode. The cancel requester receives the response from the other side and leaves the batch transfer mode.

According to the present embodiment, if continuation of a batch transfer of subsequent records becomes unnecessary because a transfer error has just occurred in the middle of the batch transfer and for other reason, it is possible to stop the batch transfer at once. Therefore, more efficient data transfer is feasible by eliminating an unnecessary transfer of logical records.

Embodiment 7

Figure 13:
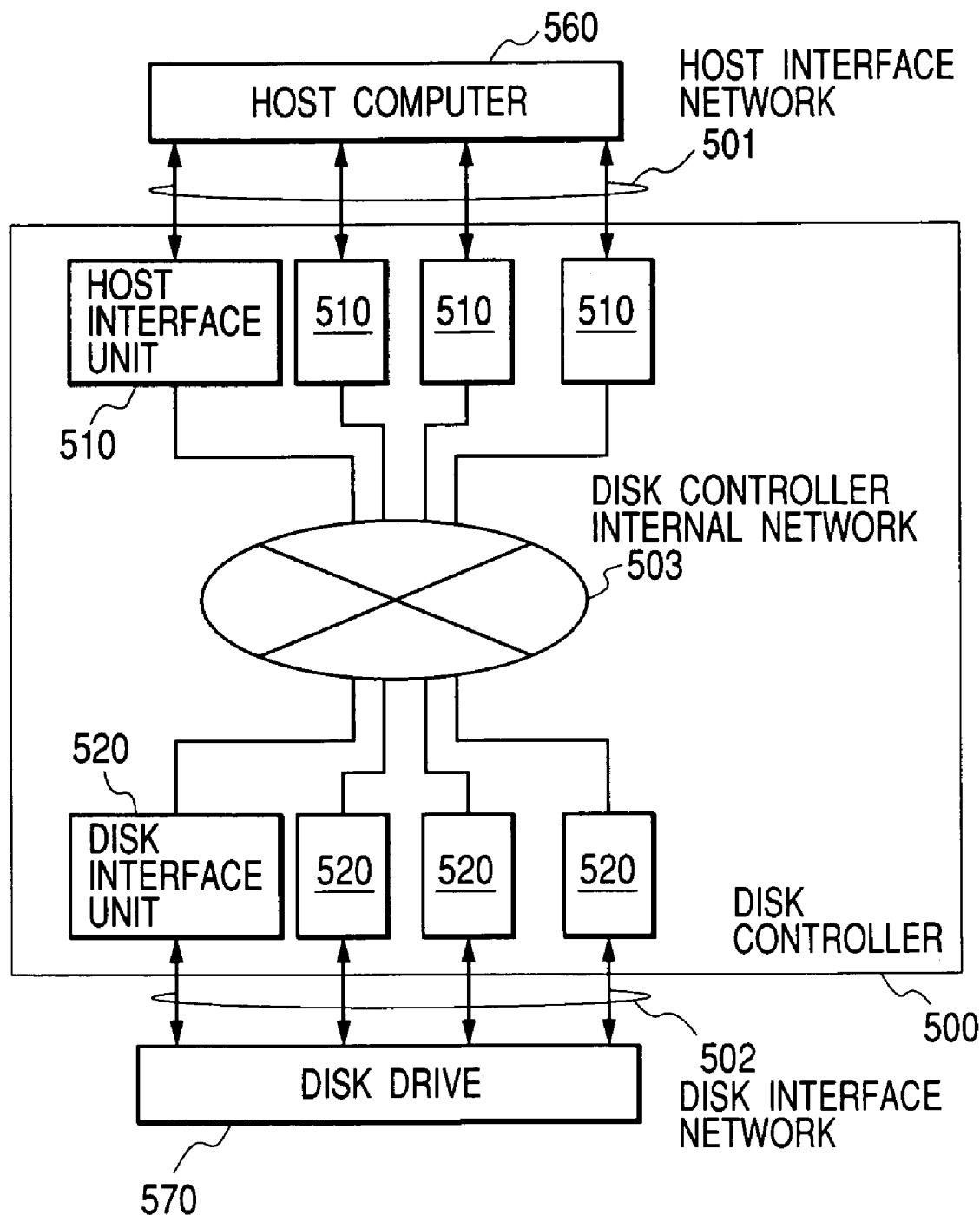
FIG. 13 is a diagram showing a disk control unit (disk controller) configuration of the present invention.
Figure 14:
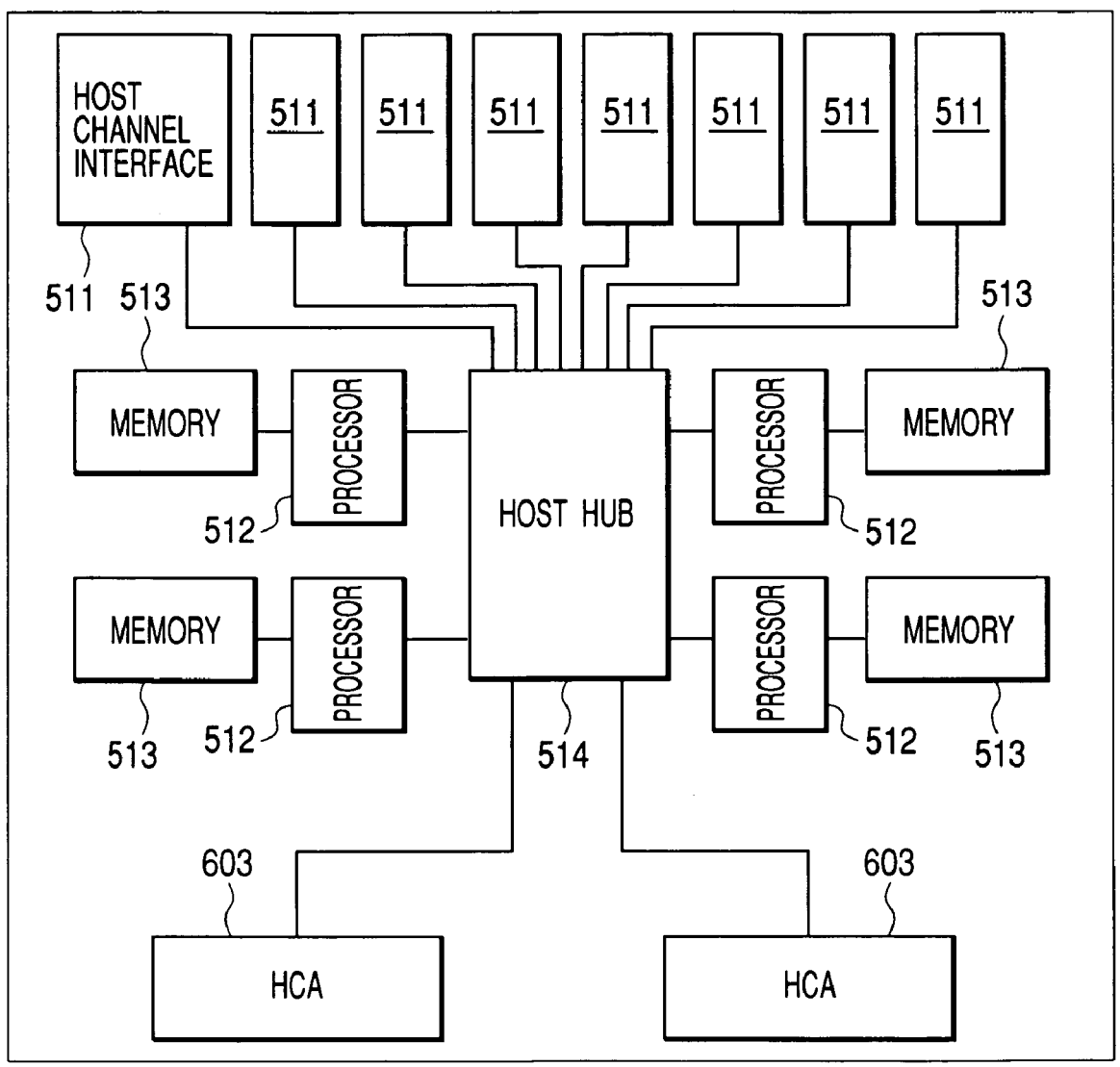
FIG. 14 is a diagram showing a host interface unit configuration employed in the disk control unit (disk controller) of the present invention.
Figure 15:
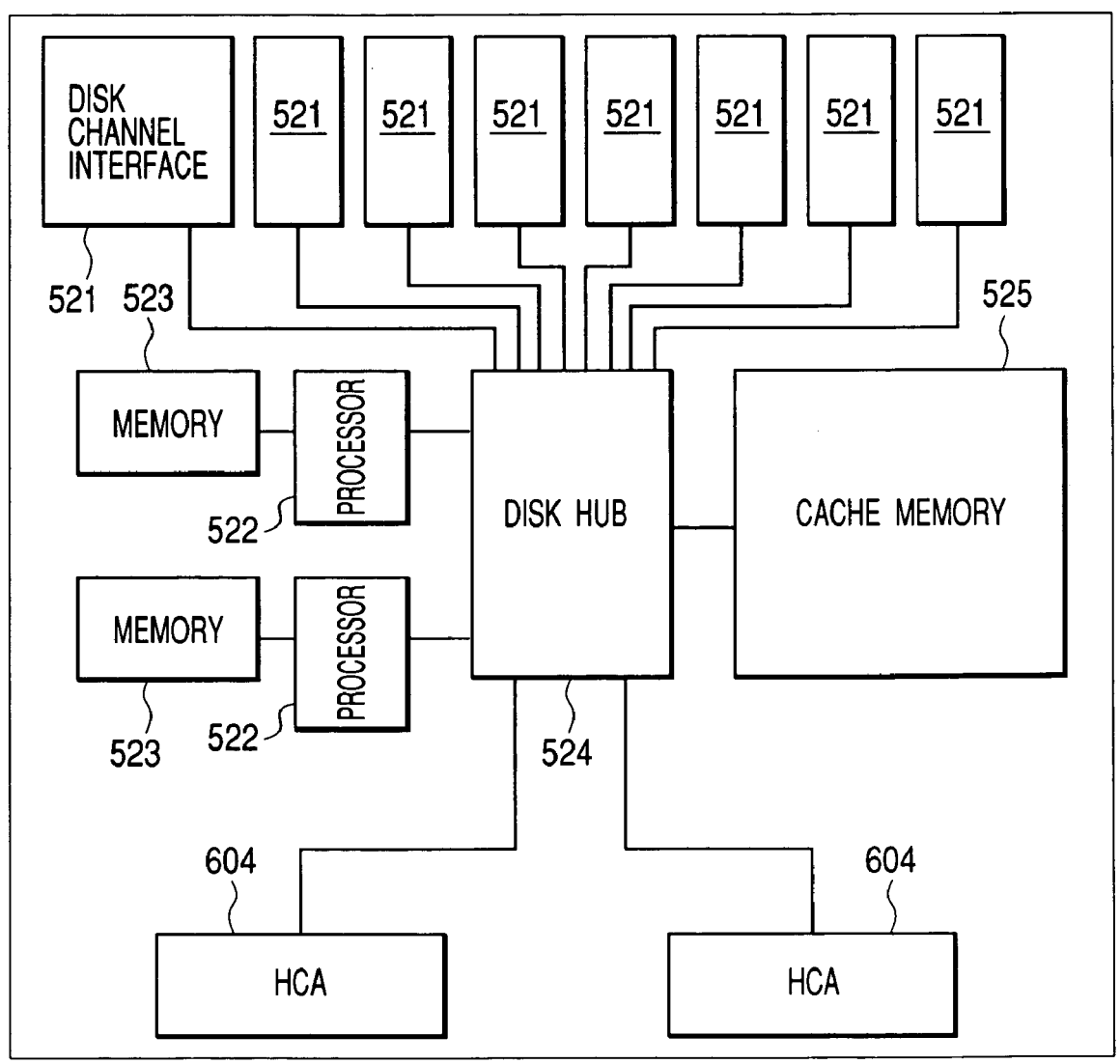
FIG. 15 is a diagram showing a disk interface unit configuration employed in the disk control unit (disk controller) of the present invention.

A preferred embodiment of the disk control unit (disk controller) of the present invention is shown in FIGS. 13, 14, and 15. In FIG. 13, the disk control unit (disk controller) 500 comprises a plurality of host interface units 510 which connect to a host computer 560 via a host interface network 501 and a plurality of disk interface units 520 which connect to disk drive equipment 570 via a disk interface network 502 and the plurality of host interface units 510 and the plurality of disk interface units 520 are interconnected via a disk control unit internal network 503.

FIG. 14 shows a host interface unit 510 configuration comprising a plurality of host channel interfaces 511, processors 512, memories 513, and HCAs 603, wherein these components are interconnected via a host hub 514.

FIG. 15 shows a disk interface unit 520 configuration comprising a plurality of disk channel interfaces 521, processors 522, memories 523, and HCAs 604, wherein these components are interconnected via a disk hub 524. Also, a cache memory 525 is connected to the disk hub 524.

Each host interface unit 510 performs data transfer between the interface with the host computer 560 and the cache memory 525. Each disk interface unit 520 performs data transfer between the interface with the disk drive equipment 570 and the cache memory 525.

Figure 5:
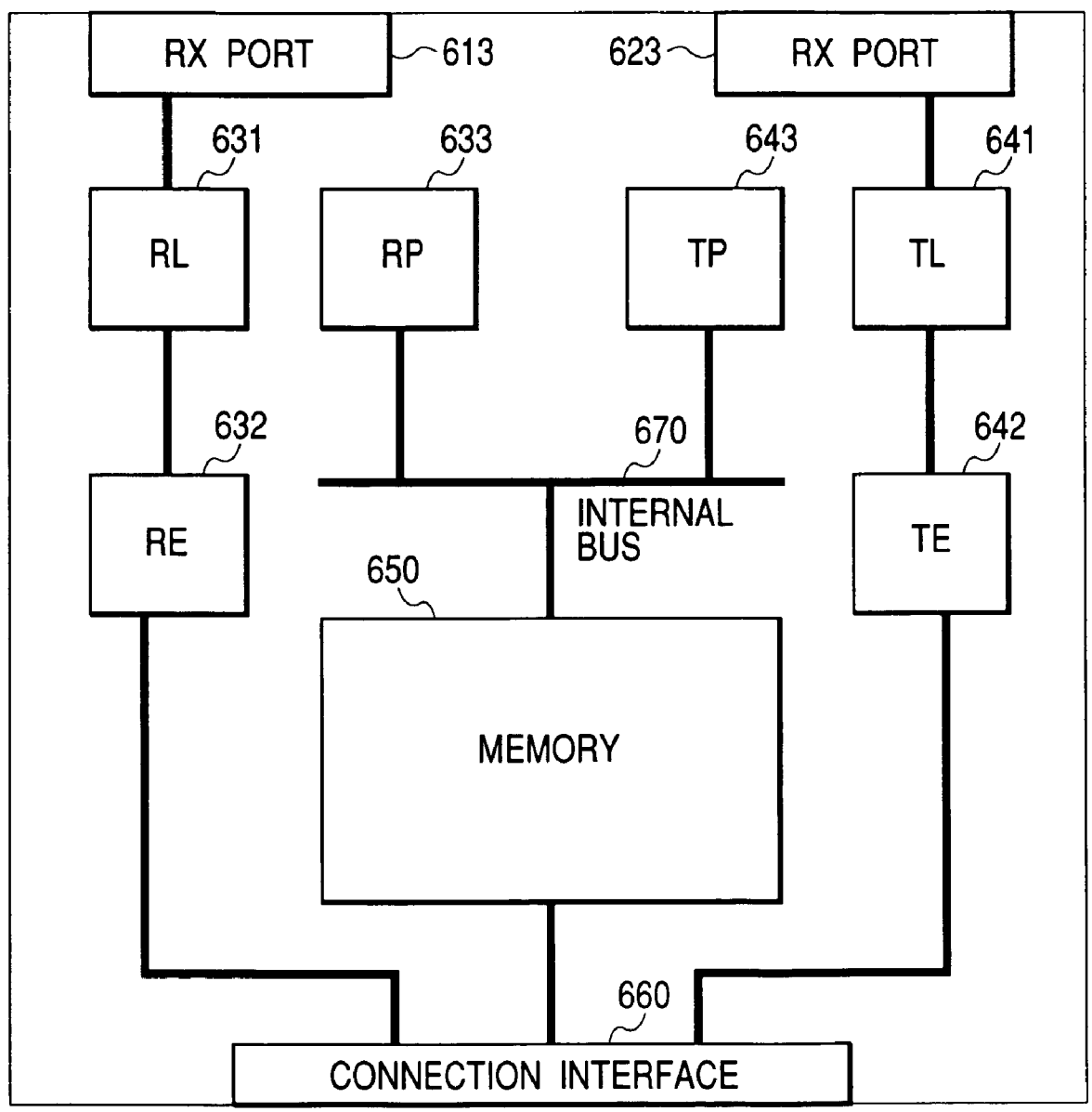
FIG. 5 is a diagram showing a host channel adapter (HCA) configuration.
Figure 6:
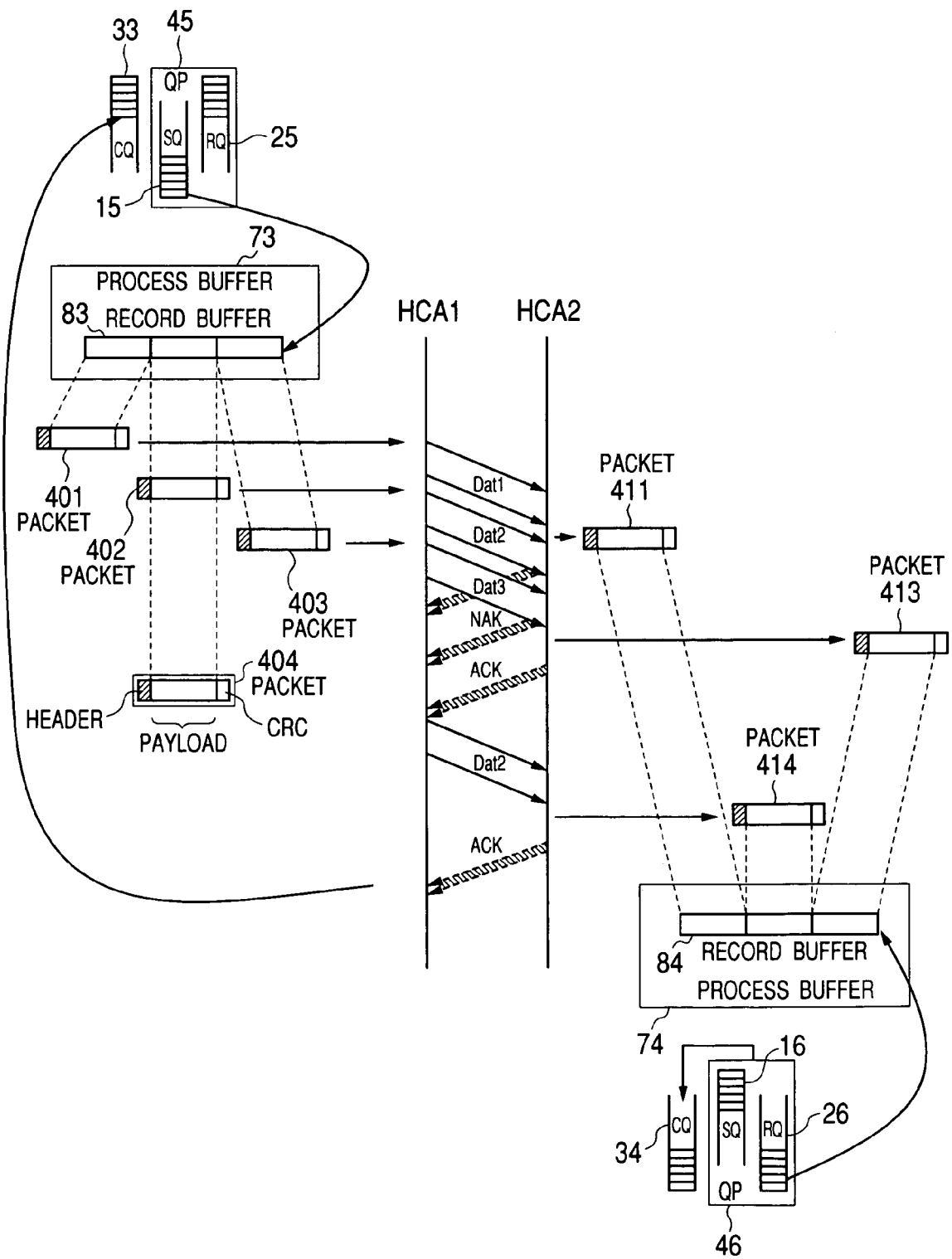
FIG. 6 is a diagram showing details of operation of a traditional method of single data transfer.
Figure 7:
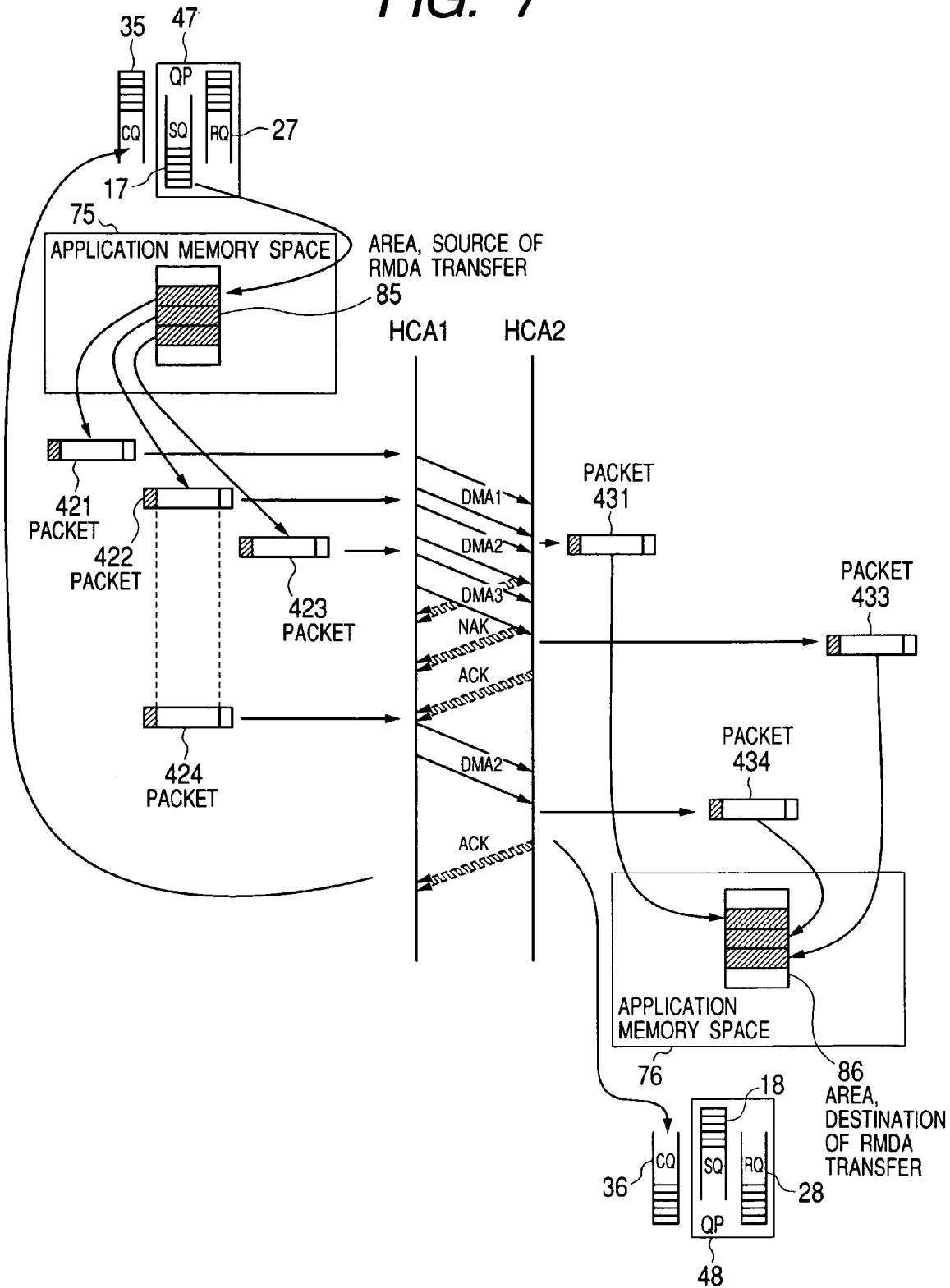
FIG. 7 is a diagram showing details of operation of a traditional method of RDMA data transfer.

The host interface unit 510 and the disk interface unit 520 perform data transfer therebetween via the HCAs 603 and HCAs 604. During this data transfer, in the host interface unit, commands and data input through the plurality of host channels converge on the host hub and are transferred to the disk interface unit. The above-described high-speed data transfer protocol is applied to this data transfer. The HCAs are essentially configured to have the same functions as the HCA functions shown in FIG. 5. For example, part of the functions may be implemented by software processes that are run on the processors 512 and processors 522.

According to the present embodiment, the efficiency of data transfer between the host computer and the disk interface units can be improved greatly. Especially, the efficiency of data transfer through the disk control unit internal network 503 is enhanced. Moreover, the response time to IO requests from the host interface units and disk interface units can be shortened and the processing capability of the disk control unit can be boosted.

Embodiment 8

The disk control unit shown in FIG. 13 redundantly stores data into the cache memories respectively incorporated in the plurality of disk interface units in order to enhance its reliability. Therefore, when a write request for data is issued from one of the host interface units 510 to the disk interface units 520, after the data is stored into the cache memory 525 in a disk interface unit, the data is redundantly written into the cache memory in another disk interface unit. For this redundant writing of data across the plurality of disk interface units, the above-described high-speed data transfer protocol is used.

The redundant data writing is essential for improving the reliability of the disk control unit, but posed a problem that such writing increases the load on the disk control unit internal network and this results in deterioration in system performance. The present embodiment makes it possible to enhance the efficiency of data transfer through the disk control unit internal network and boost the processing capability of the disk control unit.

Embodiment 9

The disk control unit shown in FIG. 13 may operate in conjunction with another disk control unit in order to realize virtual functions and the like. In that event, data transfer between local and remote host interface units must be performed. The above-described high-speed data transfer method is applied to this data transfer between local and remote host interface units.

Because a data access request must be passed through a plurality of disk controllers before target data is accessed in the case of data transfer between local and remote host interface units, the response time must be as short as possible. The present embodiment makes it possible to greatly cut the response time between the local and host interface units and boosts the processing capability of the disk controller.

Embodiment 10

Figure 16:
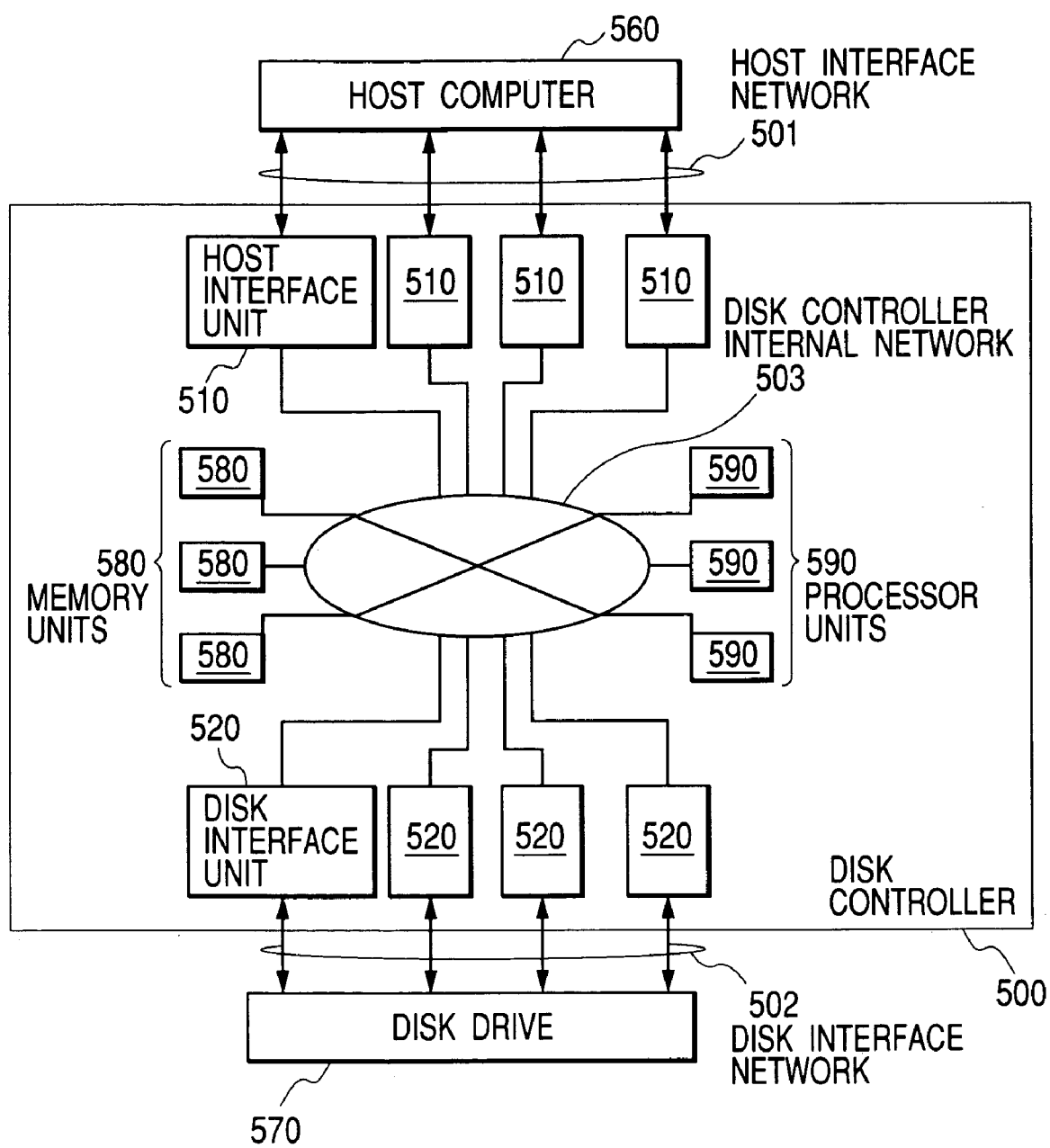
FIG. 16 is a diagram showing another disk control unit (disk controller) configuration of the present invention.
Figure 17:
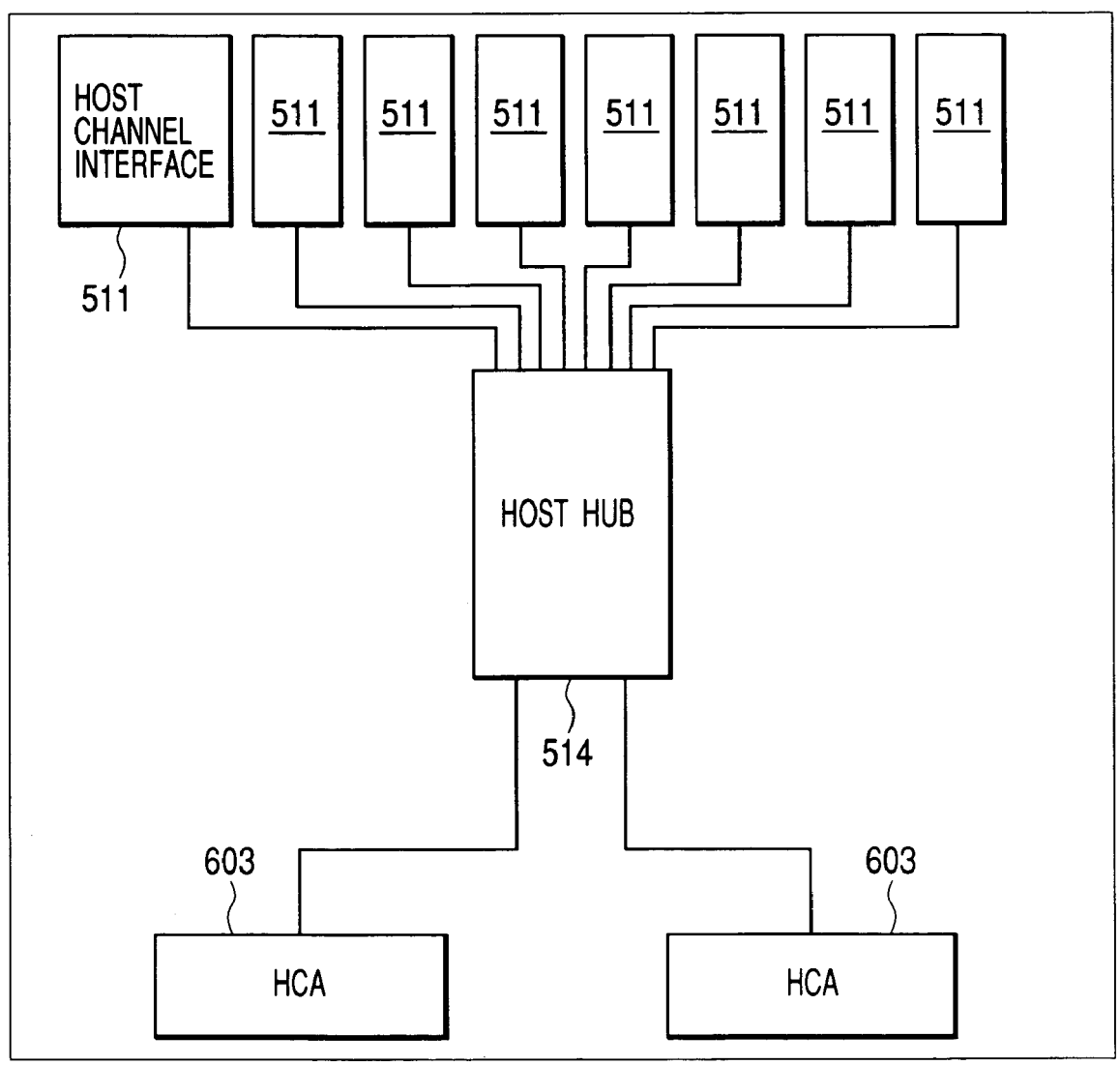
FIG. 17 is a diagram showing another host interface unit configuration employed in the disk control unit (disk controller) of the present invention.
Figure 18:
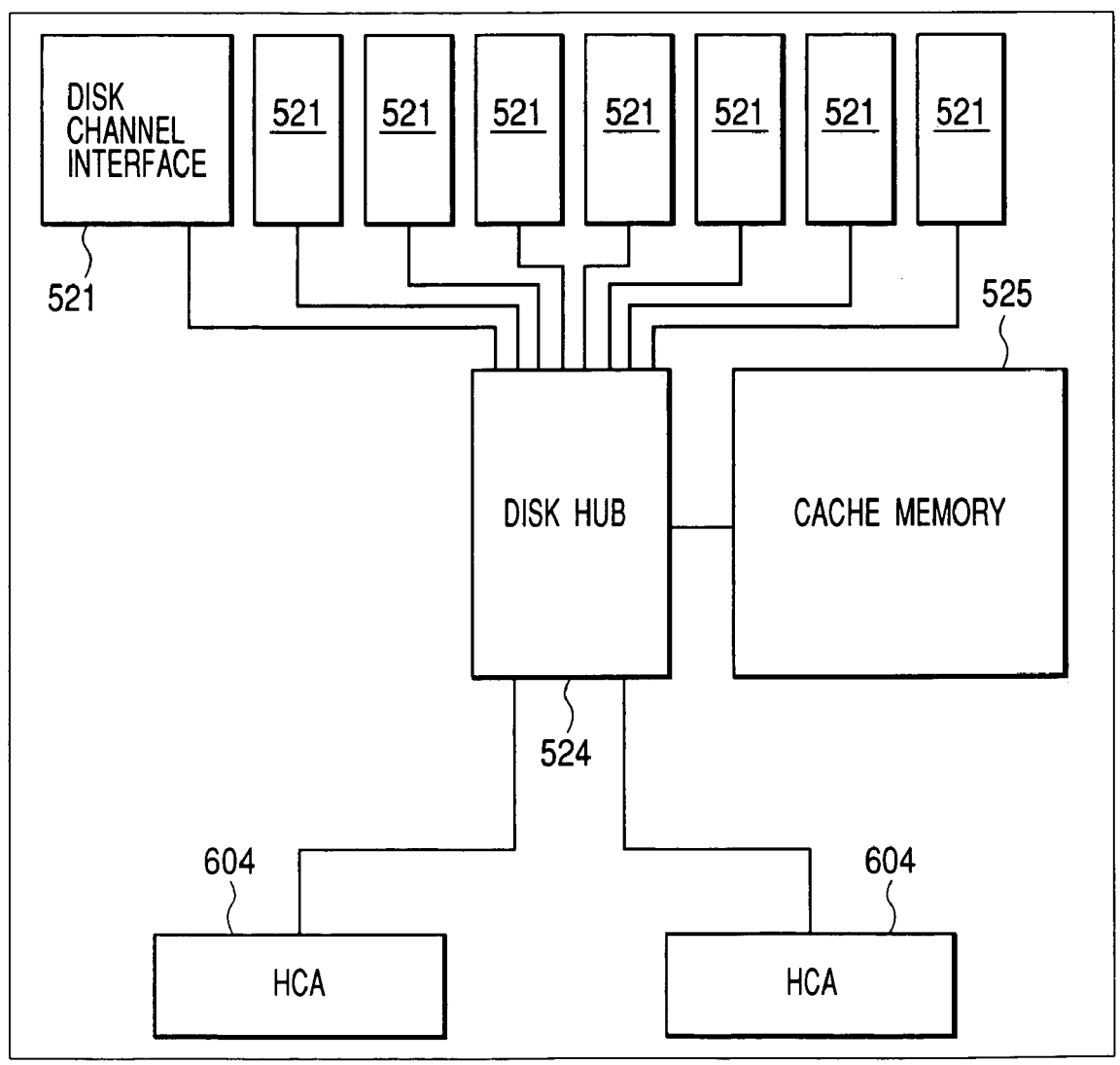
FIG. 18 is a diagram showing another disk interface unit configuration employed in the disk control unit (disk controller) of the present invention.

Another example of the disk control unit is shown in FIG. 16, where the disk control unit 500 comprises a plurality of host interface units 610 which connect to a host computer 560 via a host interface network 501 and a plurality of disk interface units 620 which connect to disk drive equipment 570 via a disk interface network 502, a plurality of memory units 580, and a plurality of processor units 590. The plurality of host interface units 610, the plurality of disk interface units 620, the plurality of memory units 580, and the plurality of processor units 590 are interconnected via a disk control unit internal network 503.

The above plurality of host interface units 610 in conjunction with the above plurality of processor units 590 perform data transfer to/from the above memory units 580. The plurality of disk interface units 620 in conjunction with the above processor units 590 perform data transfer between the above disk drive equipment 570 and the above memory units 580. The above-described high-speed data transfer method of the present invention is applied to this data transfer.

The present embodiment makes it possible to enhance the efficiency of data transfer through the disk control unit internal network 503, cut the response time to I/O requests from the host interface units 610 and disk interface units 620, and boost the processing capability of the disk control unit.

The above-described high-speed data transfer method of the present invention can be applied to data transfer between the above plurality of memory units 580 and the processor units 590, data transfer across the above plurality of memory units 580, or data transfer across the processor units 590, and, likewise, can boost the processing capability of the disk control unit (disk controller).

What is claimed is:

1. In reliable data transfer in which, when data is transferred from an initiator to a target, the data received by said target is checked for a communication error by using an error check code attached to said data, a transfer status indicating whether said communication error occurs is returned from said target to said initiator, and, if a transfer error occurring during said data transfer is detected by said transfer status, said initiator retries to transfer said data to said target, a data transfer method for transferring logical records between said initiator and said target, whereby:

a plurality of logical records are batch transferred in a block, wherein a logical record is defined as a unit of said data transfer between said initiator and said target;

said initiator confirms said transfer status at every said batch transfer;

each said logical record is transferred by a transfer request issued by said initiator, wherein each said transfer request includes a transfer ID that is uniquely determined per logical record to be transferred; and for each said logical record that meets a predetermined batch transfer condition, said target posts a completion status corresponding to said transfer request for said logical record to a completion queue existing in said target upon correct reception of said logical record.

2. In reliable data transfer in which, when data is transferred from an initiator to a target, the data received by said target is checked for a communication error by using an error check code attached to said data, a transfer status indicating whether said communication error occurs is returned from said target to said initiator, and, if a transfer error occurring during said data transfer is detected by said transfer status, said initiator retries to transfer said data to said target, a data transfer method for transferring logical records between said initiator and said target, whereby:

a plurality of logical records are batch transferred in a block, wherein a logical record is defined as a unit of said data transfer between said initiator and said target;

each said logical record is transferred by a transfer request issued by said initiator, wherein each said transfer request includes a transfer ID that is uniquely determined per logical record to be transferred, and, upon correct arrival of the logical record on said target, said target posts a completion status corresponding to said transfer request for said logical record to a completion queue existing in said target;

said initiator confirms said transfer status at every said batch transfer; and if said target detects a transfer error of said logical record in the middle of said batch transfer by said error check code, said target negates the reception of and stops posting said completion status of the logical record and subsequent logical records until said batch transfer terminates.

3. In reliable data transfer in which, when data is transferred from an initiator to a target, the data received by said target is checked for a communication error by using an error check code attached to said data, a transfer status indicating whether said communication error occurs is returned from said target to said initiator, and, if a transfer error occurring during said data transfer is detected by said transfer status, said initiator retries to transfer said data to said target, a data transfer method for transferring logical records between said initiator and said target, whereby:

a plurality of logical records are batch transferred in a block, wherein a logical record is defined as a unit of said data transfer between said initiator and said target;

said initiator confirms said transfer status at every said batch transfer;

when each said logical record transferred by a transfer request issued by said initiator arrives correctly on said target, said target posts a completion status corresponding to said transfer request for said logical record to a completion queue existing in said target, wherein each said transfer request includes a transfer ID that is uniquely determined per logical record to be transferred; and if said target detects a transfer error of said logical record in the middle of said batch transfer by said error check code, said target negates the reception of and stops posting said completion status of the logical record and subsequent logical records that are not permitted for reception by a value specified in a batch transfer condition field until said batch transfer terminates.

4. In reliable data transfer in which, when data is transferred from an initiator to a target, the data received by said target is checked for a communication error by using an error check code attached to said data, a transfer status indicating whether said communication error occurs is returned from said target to said initiator, and, if a transfer error occurring during said data transfer is detected by said transfer status, said initiator retries to transfer said data to said target, a data transfer method for logical records that are units of said data transfer between said initiator and said target, whereby:

a plurality of said logical records in a block are batch transferred;

said initiator confirms said transfer status at every said batch transfer;

each said logical record is transferred by a transfer request issued by said initiator; and for each said logical record that meets a predetermined batch transfer condition, said target posts a completion status corresponding to said transfer request for said logical record to a completion queue existing in said target upon correct reception of said logical record;

wherein, if one or more transfer errors are detected during said batch transfer between said initiator and said target, said target includes the ID of the earliest logical record in which a transfer error has been detected in said transfer status which is confirmed at every said batch transfer; and said initiator starts a transfer retry from the logical record in which the transfer error occurred, based on said transfer status.

5. In reliable data transfer in which, when data is transferred from an initiator to a target, the data received by said target is checked for a communication error by using an error check code attached to said data, a transfer status indicating whether said communication error occurs is returned from said target to said initiator, and, if a transfer error occurring during said data transfer is detected by said transfer status, said initiator retries to transfer said data to said target, a data transfer method for logical records that are units of said data transfer between said initiator and said target, whereby:

a plurality of said logical records in a block are batch transferred;

said initiator confirms said transfer status at every said batch transfer;

each said logical record is transferred by a transfer request issued by said initiator; and for each said logical record that meets a predetermined batch transfer condition, said target posts a completion status corresponding to said transfer request for said logical record to a completion queue existing in said target upon correct reception of said logical record;

wherein, if one or more transfer errors are detected during said batch transfer between said initiator and said target, said target includes a list of the IDs of the logical records in which a transfer error has been detected in said transfer status which is confirmed at every said batch transfer; and said initiator retries transfer of the logical records in which the transfer error occurred, based on said list.

6. The data transfer method as recited in claim 1, wherein, in the middle of said batch transfer, said initiator or said target can stop said batch transfer by issuing a cancel request.

* * * * *